United States Patent [19]

Ohtani

[11] Patent Number: 5,381,393
[45] Date of Patent: Jan. 10, 1995

[54] DISC LOADING MECHANISM FOR DISC DRIVING APPARATUS

[75] Inventor: Hisao Ohtani, Kanagawa, Japan

[73] Assignee: Sony Corporation, Tokyo, Japan

[21] Appl. No.: 214,152

[22] Filed: Mar. 17, 1994

Related U.S. Application Data

[63] Continuation of Ser. No. 932,642, Aug. 20, 1992, abandoned.

[30] Foreign Application Priority Data

Aug. 21, 1991 [JP] Japan ................................. 3-232483
Feb. 25, 1992 [JP] Japan ................................. 4-073192

[51] Int. Cl.⁶ .................................................. G11B 33/02
[52] U.S. Cl. ................................. 369/77.2; 369/264; 29/436
[58] Field of Search .................... 360/99.06, 99.02; 369/264, 77.2, 77.1, 75.2; 29/434, 436, 469

[56] References Cited

U.S. PATENT DOCUMENTS

| | | | |
|---|---|---|---|
| 4,841,394 | 6/1989 | Tomizawa et al. | 360/99.02 X |
| 4,979,160 | 12/1990 | Araki | 369/77.1 X |
| 4,979,161 | 12/1990 | Verhagen | 369/77.2 |
| 5,036,509 | 7/1991 | Kobayashi et al. | 369/75.2 |
| 5,043,969 | 8/1991 | Carey et al. | 369/75.2 |
| 5,140,579 | 8/1992 | Suzuki et al. | 369/77.1 |
| 5,172,360 | 12/1992 | Decoster | 369/75.2 |
| 5,187,701 | 2/1993 | Verheyen | 369/75.2 |

FOREIGN PATENT DOCUMENTS

| | | |
|---|---|---|
| 0273510A2 | 7/1988 | European Pat. Off. |
| 0356984A2 | 3/1990 | European Pat. Off. |
| 0397262A1 | 11/1990 | European Pat. Off. |
| 62-150551 | 7/1987 | Japan |

OTHER PUBLICATIONS

Patent Abstracts Of Japan, vol. 11, No. 383 (P-646), 15 Dec. 1987 & JP-A-62 150 551 (Toshiba Corporation), 4 Jul. 1987.

*Primary Examiner*—Edward K. Look
*Assistant Examiner*—Hoang Nguyen
*Attorney, Agent, or Firm*—Limbach & Limbach

[57] ABSTRACT

The present invention is concerned with a disc loading mechanism for a disc driving apparatus including a disc transport member having a tray for setting a disc on it and substantially translationally movable between an open position in which the disc may be attached to or detached from the tray and a closed position in which the disc is positioned on a turntable adapted for rotationally driving the disc, a turntable supporting member having the turntable and operatively linked to movement of the disc transport member towards a closed position for being moved substantially parallel to the disc transport member to a loading position in which the disc is positioned on the turntable, and a guide for being engaged with and guiding a guided member provided on the turntable supporting member and for moving the turntable towards the tray into engagement with the turntable when the turntable supporting member is moved to the loading position in unison with the disc transport member. The disc loading mechanism is operatively linked with the movement of the disc transport member for being moved in the direction in which a disc table supporting base plate having a disc table is moved towards and away from the disc transport member and in the direction of movement of the disc transport member for loading the disc set on the disc transport member on the disc table as the disc supporting base plate is moved towards the closed position. The invention further includes a method of assembling the disc loading mechanism from one direction to a chassis.

10 Claims, 9 Drawing Sheets

DISC LOADING MECHANISM FOR DISC DRIVING APPARATUS

This is a continuation application of co-pending application Ser. No. 07/932,642 filed on Aug. 20, 1992, now abandoned.

BACKGROUND OF THE INVENTION

1. Field of the Invention

This invention relates to a disc loading mechanism for loading a disc, such as an optical disc, on a disc driving apparatus adapted for recording desired information signals on and reproducing the recorded information signals from the disc.

2. Description of the Related Art

There has hitherto been known a disc driving apparatus in which a disc, such as an optical disc, is used as a recording medium of an external storage device for an electronic computer and in which information signals from the computer are recorded on or reproduced from the disc.

The disc driving apparatus is provided with a disc transport member supported for horizontal movement through the inside and the outside of the main body of the apparatus for transporting the disc set thereon through the inside and the outside of the main body of the apparatus, a disc table supporting base plate setting thereon a disc table for rotating the disc transported by the disc transport member, and a chucking member arranged facing the disc table with the disc transport member inbetween for chucking the disc in cooperation with the disc table. The disc table supporting base plate is supported for rotation in a direction towards and away from the disc transport member.

The disc loading mechanism transports the disc set on the disc transport member through the inside and the outside of the main body of the apparatus by the disc transport member being moved by a driving motor through the inside and the outside of the main body of the apparatus. When the disc transport member setting the disc thereon is moved by the driving motor through the inside and the outside of the apparatus, the disc table supporting base plate is rotated by the driving motor in a direction approaching the disc transport member for projecting the disc table into the inside of the disc transport member. With the disc table thus projected into the inside of the disc transport member, the disc set on the disc transport member is set on the disc table while being pressed against the chucking member. The disc set on the disc table and pressed against the chucking member is mounted on the disc table and loaded in position so as to be rotated in unison with the disc table.

That is, the disc loading mechanism is so designed that the disc transport member for transporting the disc through the inside and the outside of the main body of the apparatus is moved horizontally by the driving motor and, after the disc within the main body of the apparatus has been moved by the disc transport member to a position of chucking the disc on the disc table, the disc table supporting base plate is rotated by the driving motor in the direction of approaching the disc transport member for mounting the disc on the disc table by cooperation of the disc table with the chucking member.

Meanwhile, there are provided on the disc table supporting base plate, besides the abovementioned disc table, a spindle motor for rotationally driving the disc table, an optical pickup device for recording or reproducing information signals on or from the disc and a feed device for feeding the optical pickup device. For this reason, the disc table supporting base plate is increased in weight. An extremely large force is required for supporting the heavy base plate by means of a rotating supporting shaft and rotating the base plate about the rotating supporting shaft as a center of rotation. Hence, a large size driving motor is required as a driving source, as a result of which the disc driving apparatus becomes bulky in size.

OBJECTS AND SUMMARY OF THE INVENTION

It is an object of the present invention to provide a disc loading mechanism for a disc driving apparatus in which, by reducing the load encountered during rotation of the disc table supporting base plate, the disc may be loaded lightly by a manual operation without employing a driving source, such as a driving motor.

It is another object of the present invention to provide a disc loading mechanism for a disc driving apparatus whereby the disc transported by the disc transport member may be positively chucked with respect to the disc table.

It is a further object of the present invention to provide a disc loading mechanism for the disc driving apparatus in which a guide system for the disc table supporting member mounting the disc table may be simplified in structure to enable the number of components to be reduced.

It is yet another object of the present invention to provide a disc loading mechanism for the disc driving apparatus in which the disc table supporting member mounting the disc table and adapted for being moved to follow up with the disc driving apparatus may be assembled from one direction to a chassis constituting the disc driving apparatus.

It is yet another object of the invention to further include a method of assembling the disc loading mechanism from one direction to a chassis.

In accordance with the present invention, there is provided a disc loading mechanism for a disc driving apparatus comprising a disc transport member having a tray for setting a disc thereon and substantially translationally movable between an open position in which the disc may be attached to or detached from said tray and a closed position in which the disc is positioned on a turntable for rotationally driving said disc, a turntable supporting member having said turntable and operatively linked to movement off said disc transport member towards said closed position for being moved substantially parallel to said disc transport member to a loading position in which said disc is positioned on said turntable, and a guide for being engaged with and guiding a guided member provided on said turntable supporting member and for moving said turntable towards said tray into engagement with said turntable when said turntable supporting member is moved to said loading position in unison with said disc transport member.

By movement of the disc transport member, the disc loading mechanism according to the present invention may be transported between an open position in which the disc set on the disc transport member may be loaded and unloaded and a closed position in which the disc set on the disc transport member may be positioned and loaded on the disc table. The disc loading mechanism is operatively linked with the movement of the disc transport member for being moved in the direction in which a disc table supporting base plate having a disc table is moved towards and away from the disc transport member and in the direction of movement of the disc transport member for loading the disc set on the disc transport member on the disc table as the disc supporting base plate is moved towards the closed position.

DETAILED DESCRIPTION OF THE PREFERRED EMBODIMENTS

Figure 1:
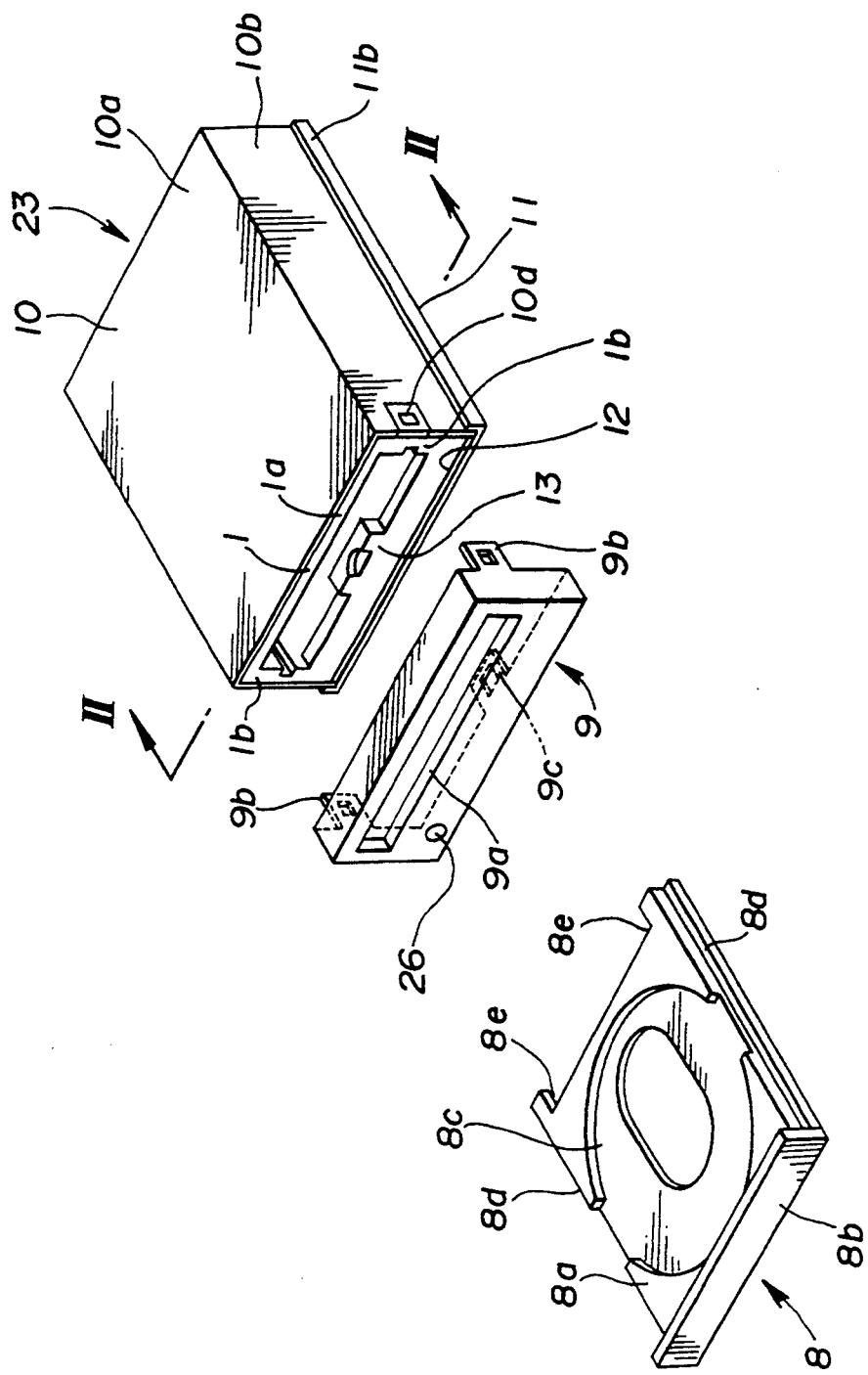
FIG. 1 is an exploded perspective view showing the state in which a disc tray and a front panel are attached to a main body of the disc driving apparatus into which a disc loading mechanism according to the present invention is assembled.

Referring to the drawings, an embodiment of the disc loading mechanism of the present invention, as applied to a simple type CD-ROM driving apparatus, is explained.

Figure 4:
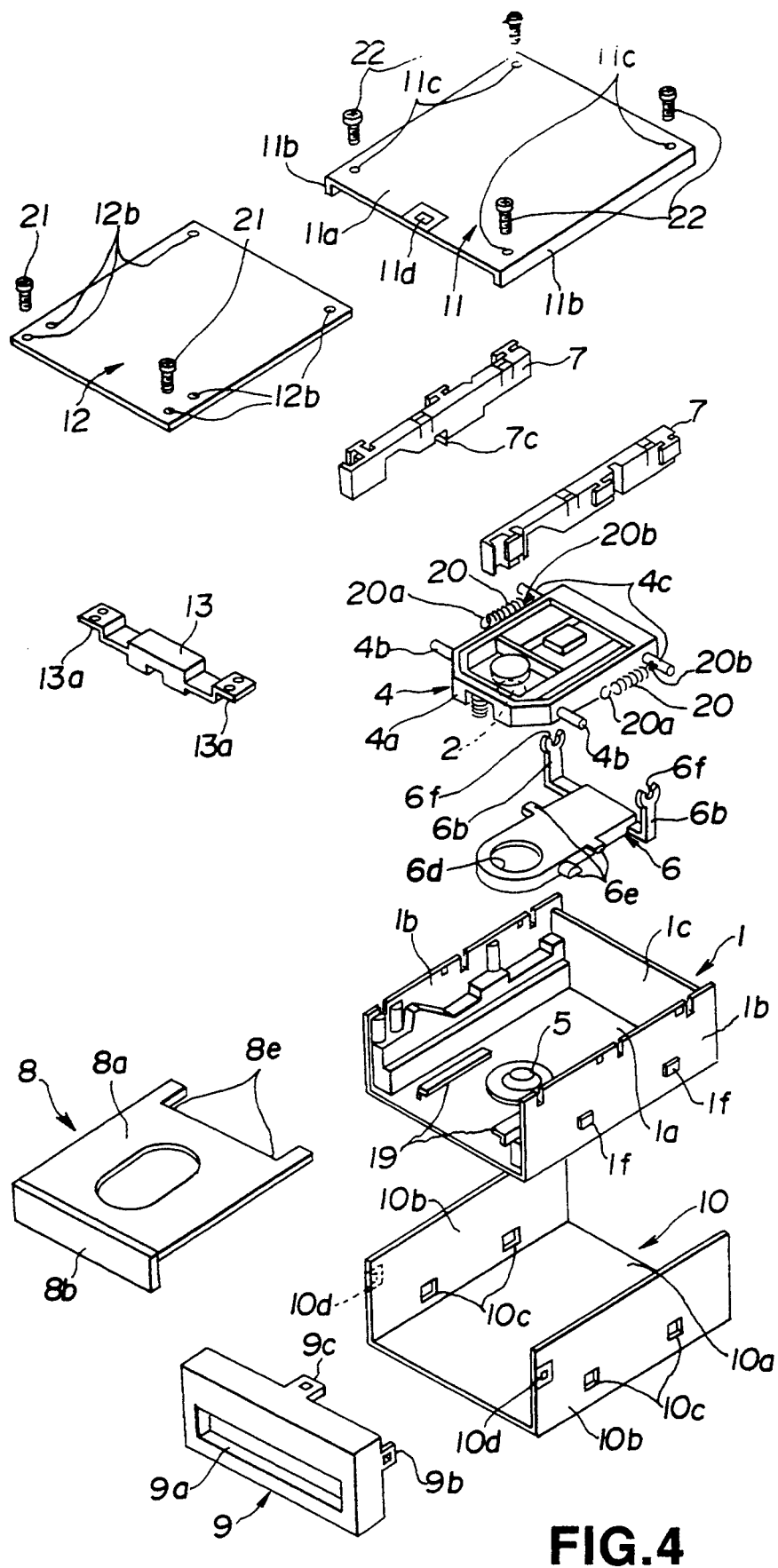
FIG. 4 is an exploded perspective view of a disc loading mechanism of the disc driving apparatus according to the present invention.
Figure 5:
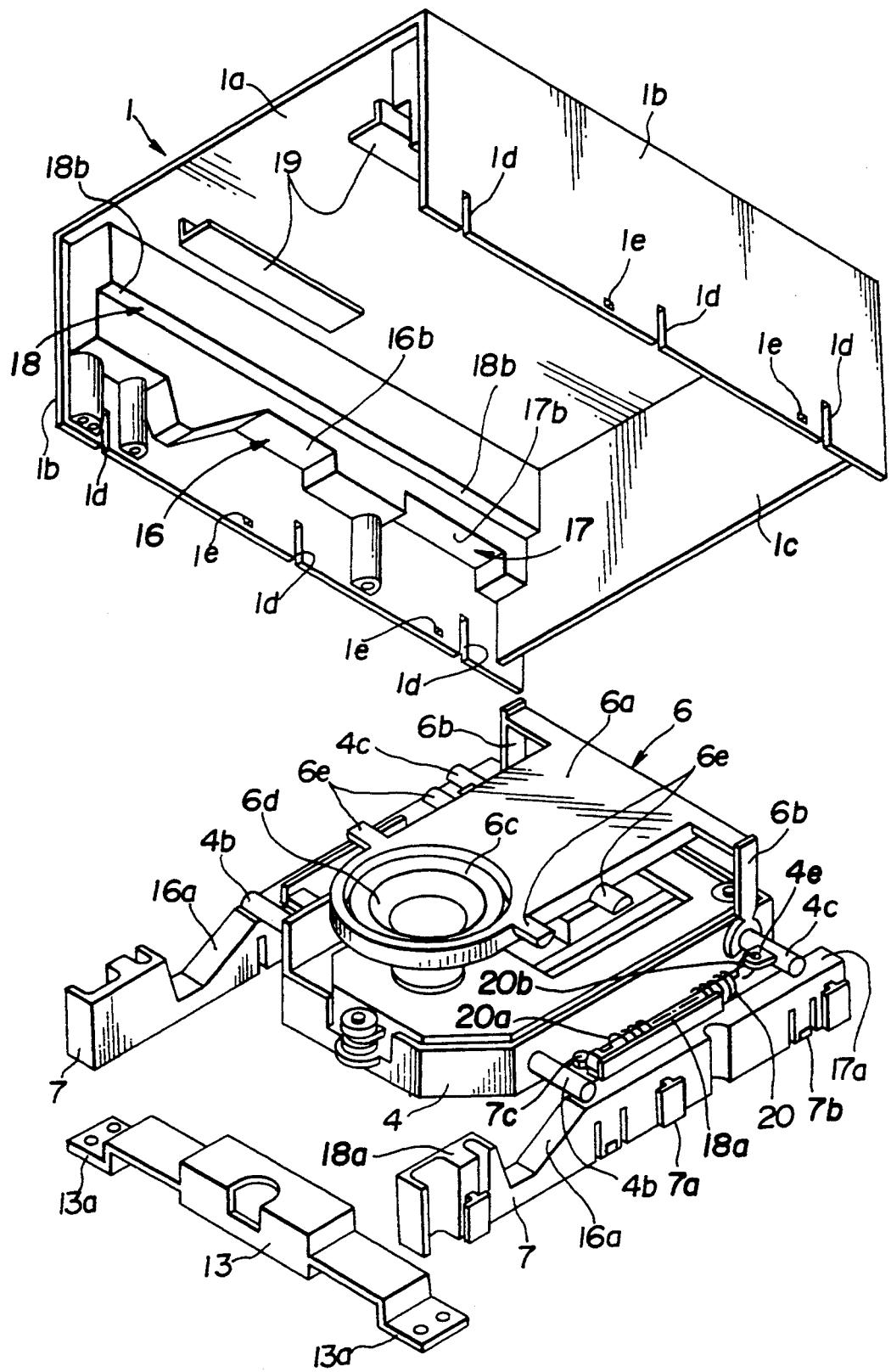
FIG. 5 is an exploded perspective view showing a chassis, a moving block and guide components constituting a disc loading mechanism of the disc driving apparatus according to the present invention.

Referring first to FIGS. 1, 4, 5 an 6, components of the disc driving apparatus to which the disc loading mechanism according to the present invention is applied, are explained. In FIG. 4, the disc driving apparatus is shown in an upside-down position.

The disc driving apparatus is substantially made up of a chassis 1, a movement block 4 as a supporting member 2, carrying a disc table for and an optical pickup 3, a clamper slider 6 holding a disc clamper 5, left and right guide components 7, a disc tray 8, a front panel 9, upper and lower shield covers 10, 11, a printed circuit board 12 and a tray-locking block 13.

The chassis 1 is molded of synthetic resin in the form of a box comprised of an upper plate 1a, left and right side plates 1b and a rear plate 1c integrally molded with one another and opened on lower and front sides, as shown in FIG. 4.

Figure 6:
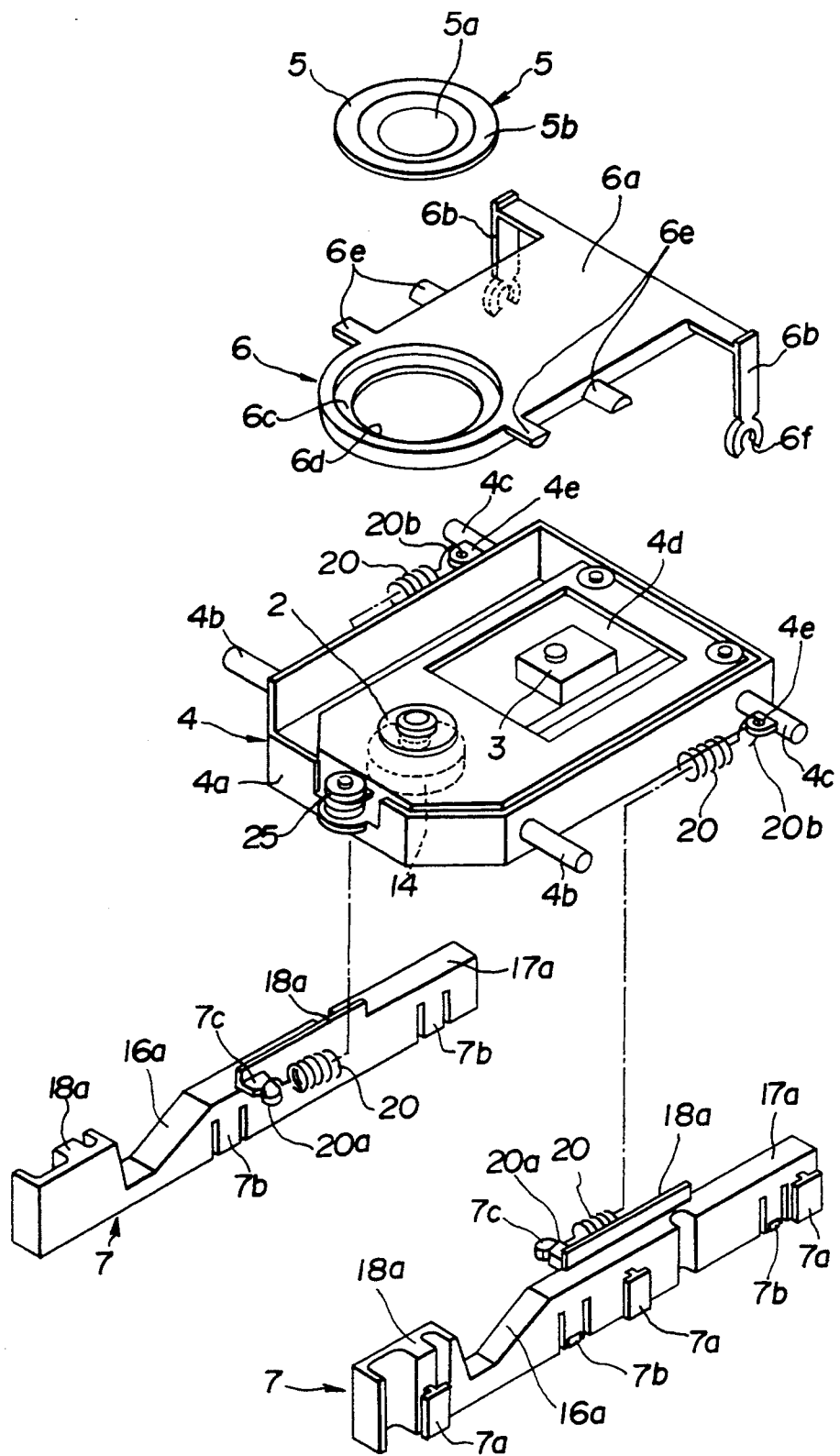
FIG. 6 is an exploded perspective view showing guide components, a moving block and a clamper slider constituting a disc loading mechanism of the disc driving apparatus according to the present invention.

The movement block 4 is molded of synthetic resin as a horizontal main block body 4a, both lateral sides of which are molded integrally with forward and rear guided parts 4b, 4c in the form of horizontal pins. As shown in FIG. 6, the disc table 2 is attached to an upper part of a forward end face of the block main body 4a, and the optical pickup 3 is mounted within an aperture 4d formed in the block main body 4a at the rear side of the disc table 2 for movement horizontally in the fore-and-aft direction by a linear motor, not shown.

Figure 2:
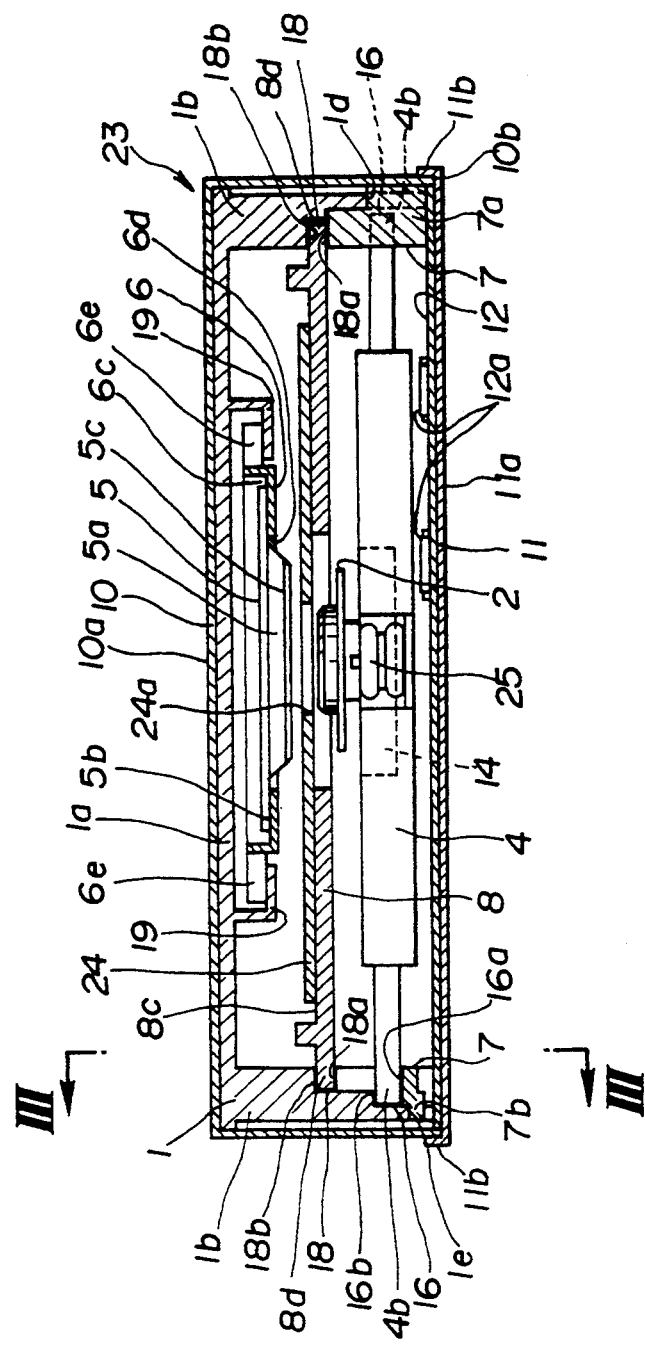
FIG. 2 is a cross-sectional view along line II—II of FIG. 1.

The disc clamper 5 is molded from synthetic resin in the form of a single-sided flange structure in which a horizontal single flange 5b is unitarily molded only at an upper end of an inverted frusto-conical clamper main body 5a, as shown in FIG. 2. A metal plate 5c for magnetic chucking is mounted horizontally on the lower surface of the clamper main body 5a, such as with an adhesive.

The clamper slider 6 is molded from synthetic resin and is comprised of a horizontal main slider body 6a to the lower rear end of which left and right legs 6b are molded integrally. The upper surface of the distal side of the slider main body 6a has a circular recess 6c at a mid part of which a circular clamper mounting hole 6d is formed concentrically with the recess.

Left and right guide components 7 are molded of synthetic resin to a symmetrical shape and, as shown in FIGS. 2 and 6, tee shaped retention pawls 7a and resilient retention pawls 7b as detachable coupling means with respect to the chassis 1, are integrally molded on the left and right lateral surfaces of these guide components 7. The chassis 1 has left and right side plates 1b formed with forward and rear vertically extending retention grooves 1d and retention holes 1e which are open at the lower ends and which are engaged by the tee-shaped retention pawls 7a and the resilient retention pawls 7b, respectively, as best seen in FIG. 5.

The disc tray 8 is molded from synthetic resin and comprised of a horizontally extending decorative tray plate 8b which is detachably connected with a snap fit to the forward end of the horizontal main tray body 8a, in a manner not shown. Referring to FIG. 1, an annular disc-fitting recess 8c is formed on the upper surface of the main tray body 8a and left and right guide rails 8d are formed along the left and right sides of the main tray body 8a.

The front panel 9 is molded from synthetic resin and is formed with horizontally extending tray inlet/outlet 9a. As shown in FIG. 1, left and right resilient retention pawls 9b are formed on the rear side of the front panel 9 and a resilient retention pawl 9c is formed at the lower center of the rear side of the front panel 9.

As best seen in FIG. 4 (which shows the apparatus upside down) and FIG. 5, upper and lower shield covers 10, 11 are formed of metal sheets. That is, the upper shield cover 10 is formed from the upper plate 10a and left and right side plates 10b to a U-shaped cross-section with a larger depth along both arms of the letter U equal to the depth of the chassis 1 , while the lower shield cover 11 is formed from a bottom plate 11a and left and right side plates 11b to a U-shaped cross-section of a shallower depth along both arms of the letter U. The left and right side plates 10b of the upper shield cover 10 are formed with retention holes 10c and four screw holes 11c are formed at four corners of he bottom plate 11a of the upper shield cover 11. Retention pawls if are retained in the retention holes 10c are formed on the left and right sides of the left and right side plates 1b of the chassis 1. Three retention holes 10d, 11d, in which the three resilient retention pawls 9b, 9c are retained, are formed on the forward sides of the left and right side plates 10b and the bottom plate 11 of the shield covers 10, 11.

A control circuit 12a for the optical pickup 3 and a spindle motor 14 is packaged on the upper surface of the printed board 12b, to receive screws 21, and a total of six tapped holes 12 are formed in the printed board 12, as shown in FIG. 4.

Figure 3:
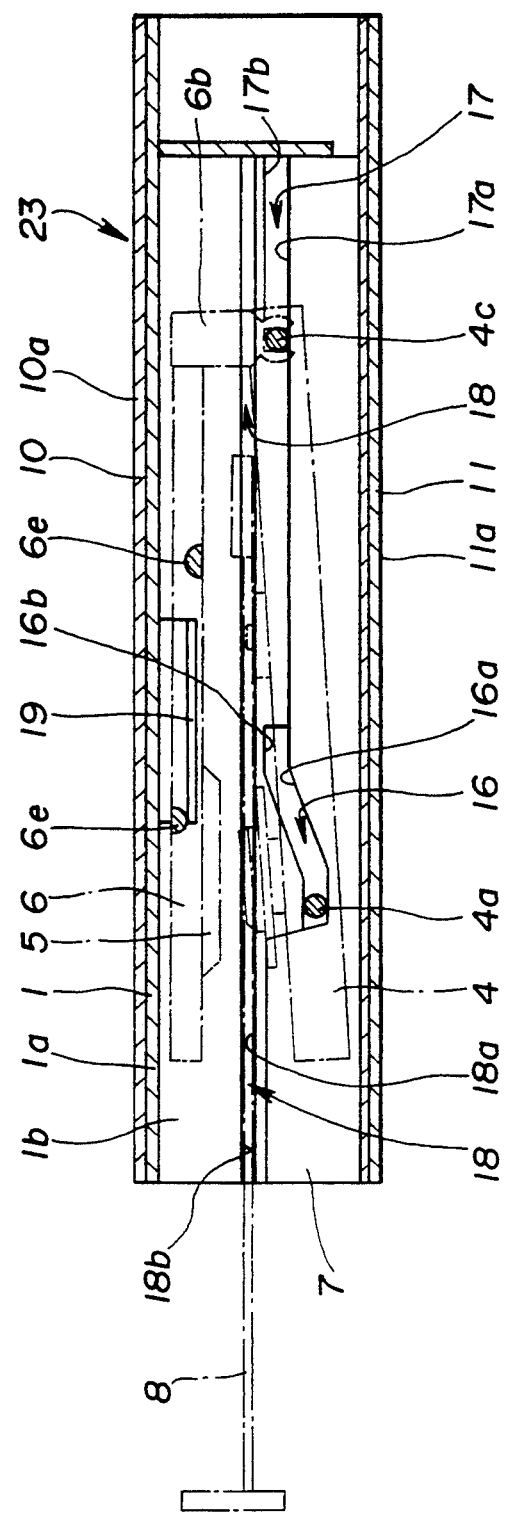
FIG. 3 is a cross-sectional view along line III—III of FIG. 2.

Referring to FIGS. 2, 3 and 5, the inner wall surfaces of the left and right side plates 1b of the chassis 1 are integrally formed with substantially crank-shaped left and right front guide grooves 16 for guiding left and right forward guided parts 4b on the front side of the movement block 4 and horizontal left and right rear guide grooves 17 for guiding the left and right rear guided parts 4c. The inner wall surfaces of the left and right side plates 1b of the chassis 1 are formed with horizontal left and right tray guide grooves 18 for guiding left and right guide rails 8d of the disc tray 8. The tray guide grooves 18 are formed above the guide grooves 16 and 17 between the front end of the chassis 1 and the forward guide grooves 16 and between the forward guide grooves 16 and the rear guide grooves 17.

Referring to FIGS. 2, 3 and 5, lower guide surfaces 16a, 17a, 18a of these guide grooves 16, 17, 18 are defined by upturned steps formed in the left and right guide components 7, while downturned upper guide surfaces 16b, 17b, 18b are defined by downturned steps formed in the left and right side plates 1b.

Left and right guided projections 6e presenting vertical step differences are molded integrally with left and right lateral sides of the forward end of the clamper main body 6a of the clamper slider 6. Left and right horizontal guide rails 19 for guiding these guided projections 6e are molded integrally with the lower surface of the upper plate 1a of the chassis 1. A tray-locking block 13 is fitted with an electromagnetic locking device, not shown, for the disc tray 8, and tapped holes 13a are formed in left and right ends of the block 13.

The sequence of assembling the disc driving apparatus is explained by referring to FIG. 4.

The chassis 1 is set horizontally in the upside-down position and the disc clamper 5 is set in the upside-down position on the upper plate 1a.

The clamper slider 6 is mounted on the disc clamper, in the upside down position, so that the clamper mounting hole 6d is loosely fitted from above on the outer rim of the clamper main body 5a of the disc clamper 5. The clamper slider 6 is then slid in the fore-and-aft direction, that is in the longitudinal direction of the chassis 1, on the upper plate 1a of the chassis 1, so that the left and right guided projections 6e are engaged with upper and lower sides of the left and right guide rails 19.

The left and right guide rails 8d of the disc tray 8 are set horizontally on the left and right upper guide surfaces 18b of the left and right side plates 1b of the chassis 1. At this time, the left and right projections 8e formed at the rear ends of the tray main body 8a of the disc tray 8 are abutted against the front lateral sides of the left and right legs 6b of the clamper slider 6.

The movement block 4 is then inverted in its position and proximal sides of the rear left and right guided parts 4c of the movement block 4 are fitted into C-shaped fitting holes 6f formed at the distal ends of left and right legs 6b of the clamper slider 6, while the four left and right guided parts 4b, 4c of the movement block 4 are set on the four upper guide surfaces 16a, 17a of the left and right side plates 1b of the chassis 1.

The left and right guide components 7 are inverted in their positions and introduced into the inside of the left and right side plates 1b of the chassis 1 from above so that the tee-shaped retention pawls 7a of the guide components 7 are introduced from above into the retention grooves 1d of the left and right side plates 1b and ultimately the plural resilient retention pawls 7b are retained in the retention hole for assembling the left and right guide components 7 in the inside of the left and right side plates 1b from above.

Referring to FIGS. 2 and 3, the left and right upper guide surfaces 16b, 17b, 18b of the chassis 1 are then brought into a parallel facing relation with respect to the left and right lower guide surfaces 16a, 17a, 18a of the left and right guide components 7 in a vertically spaced apart relation and the left and right forward guide grooves 16, rear guide grooves 17 and the tray guide grooves 18 are assembled within the spacing between the upper and the lower guide surfaces. Meanwhile, the cross-sectional position of the forward guide grooves 16 are shown to be deviated in FIG. 1.

Still referring to FIGS. 2 and 3, the forward left and right guided parts 4b of the movement block 4 are slidably assembled into the space between the upper and lower guide surfaces 16a, 16b of the thus assembled left and right forward guide grooves 16, while the rear left and right guided parts 4c of the movement block 4 are slidably assembled into the space between the left and right rear guide surfaces 17a, 17b of the rear left and right guide grooves 17. The left and right guide rails 8d of the disc tray 8 are slidably assembled in the space between the upper and lower guide surfaces 18a, 18b of the left and right tray guide grooves 18.

Thus the left and right guided parts 4b, 4c of the movement block 4 and the left and right guide rails 8d of the disc tray 8 may be assembled into the guide grooves 16, 17 and 18 at the same time that the left and right forward guide grooves 16, rear guide grooves 17 and the tray guide grooves 18 are assembled together.

At this time point, as shown in FIGS. 5 and 6, forward and rear ends 20a, 20b of left and right coil springs 20 for urging the restoration of the movement block 4 are retained by spring retainers 7c molded integrally with the left and right guide components 7 and left and right spring retainers 4e molded integrally with proximal ends of the left and right guided parts 4c at the rear end of the movement block 4.

Then, after connecting harnesses (not shown) drawn out of the tray-locking block 13 and the movement block 4 to connectors etc. of the printed board 12, the tray-locking block 13 is inverted in its position, and left and right ends thereof are set on the forward ends of the left and right side plates 1b of the chassis 1. The printed board 12 is inverted in its position and set on the left and right side plates 1b of the chassis 1 for overlying the tray-locking block 13, Two screws 21 are threaded into left and right tapped holes 12b on the forward end of the printed board 12 and left and right tapped holes 13a of the tray-locking block 13 from above for clamping the printed board 12 and the tray-locking block 13 together for screwing the printed board to the left and right side plates 1b of the chassis 1.

The chassis 1 is inserted in the upside-down position into the inside of the left and right side plates 10b of the upper shield cover 10, which is similarly in the upside-down position, and the upper plate 1a of the chassis 1 is intimately contacted with the upper plate 10a so that the retention pawls 1f on the left and right sides of the left and right side plates 1b of the chassis 1 are retained in the retention holes 10c against resiliency of the left and right side plates 1b.

The lower shield cover 11 is inverted in its position and placed over the printed board 12 so that the shallow left and right side plates 11b are fitted on the outer sides of the left and right side plates 10b of the upper shield cover 10. Four screws 22 are introduced into four tapped holes 11c of the shield plate 11 and the remaining four tapped holes 12b of the printed board 12 for clamping the shield plate 11 and the printed board 12 together for screwing the shield plate and the printed board 12 to the left and right side plates 1b of the chassis 1.

In this manner, a main body of the disc driving apparatus, having only the front side opened, as shown in FIGS. 1 and 2, is assembled. The main body of the disc driving apparatus thus assembled is shown in the normal upstanding position in FIGS. 1 and 2. Although the disc tray 8 is shown in an exploded state, the rear end of the tray main body 8a of the disc tray 8 is introduced into the inside of the chassis 1, while the decorative tray plate 8b is not in the assembled state.

The front panel 9 is introduced via tray input/output 9a into the outer rim on the front side of the disc tray 8a and the front panel 9 is fitted to the outer rim of the forward end of the main body of the disc driving apparatus 23 for closing the front side of the main body 23. Four resilient retention pawls 9b, 9c of the front panel 9 are retained in the three retention holes 10d, 11d of the upper and lower shield plates 10, 11 against resiliency of the shield plates.

The decorative tray plate 8b of the disc tray 8 is fitted with a snap fit to the forward end of the tray main body 8a of the disc tray 8 from the outer side of the front panel 9 to complete assembling of the entire disc driving apparatus.

With the disc driving apparatus, constituted and assembled as described above, the chassis is set in an upside-down position, and the disc clamper 5, clamper slider 6, disc tray 8, movement block 4, left and right guide components 7 and the tray-locking block 13 are stacked in upside-down positions within the inside of the chassis 1 so that the assembling operation may be carried out from one direction and hence may be facilitated significantly.

If the main body of the disc driving apparatus 23, assembled as described above, is inverted to its normal upstanding position, the disc clamper 5 is suspended by the single flange 5b within the recess 6c of the clamper slider 6 right above the disc table 2, the clamper main body 5a being projected downwardly from the clamper mounting hole 6d and the flange 5b being sandwiched and held between the clamper slider 6 and the upper plate 1a of the chassis 1 with play. It is noted that the clamper slider 6 is engaged above and below the left and right guide rails 19 by the four upper and lower guide projections 6e in a chattering-free state, as shown in FIG. 2.

Figure 7:
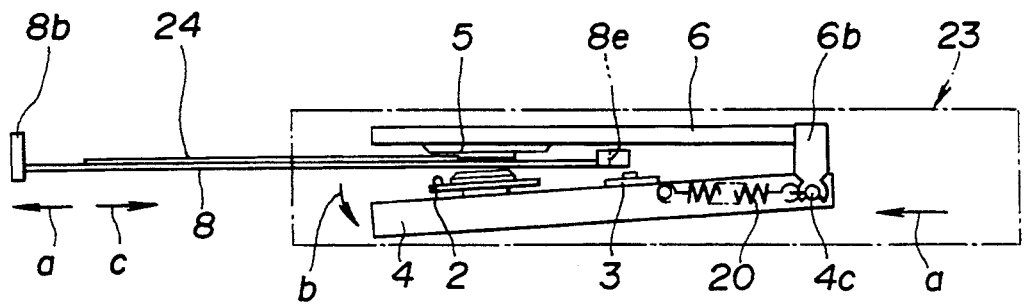
FIGS. 7A to 7C are side elevational views showing a disc loading mechanism for explaining the disc loading operation, with a portion thereof being cut away.
Figure 7:
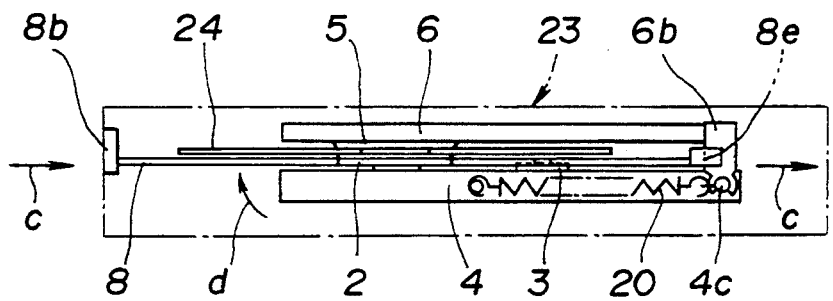
Figure 7:
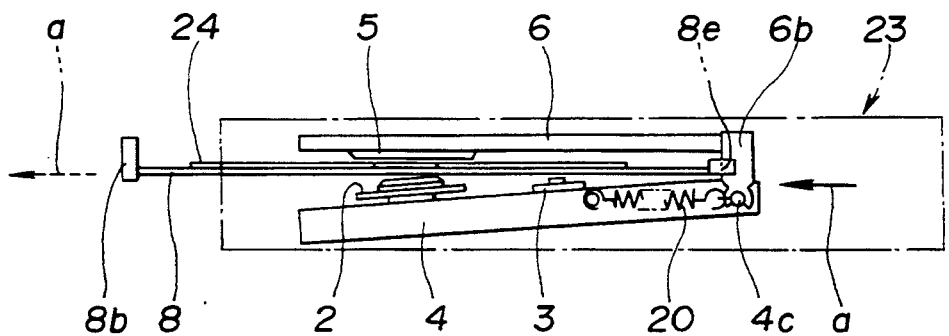

The loading and ejecting operations of the disc apparatus. assembled as described above, is explained by referring to FIGS. 7 to 9.

When the disc tray 8 is guided by the left and right guide rails 8d and the tray guide grooves 18 and drawn out horizontally from the main body of the apparatus 23 in the direction of an arrow a in FIG. 7A, the left and right guided parts 4c at the rear end of the movement block 4 are urged into movement by left and right tension coil springs 20 in the direction shown by arrow a, so that the movement block 4 and the clamper slider 6, connected to the left and right guided parts 4c via left and right legs 6b, are both moved in the direction of the arrow a. It is noted that the disc tray is halted with the rear end of the disc tray 8, drawn out in the direction of the arrow a, being abutted against the tray-locking block 13 from the direction of the arrow a.

Figure 8A:
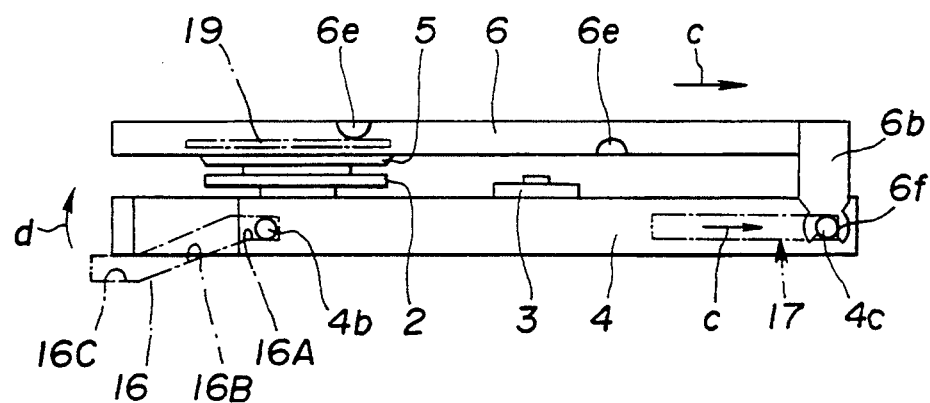
FIGS. 8A and 8B are schematic side elevational views for explaining the movement of the disc clamper slider and the movement block mounting the disc table.
Figure 8B:
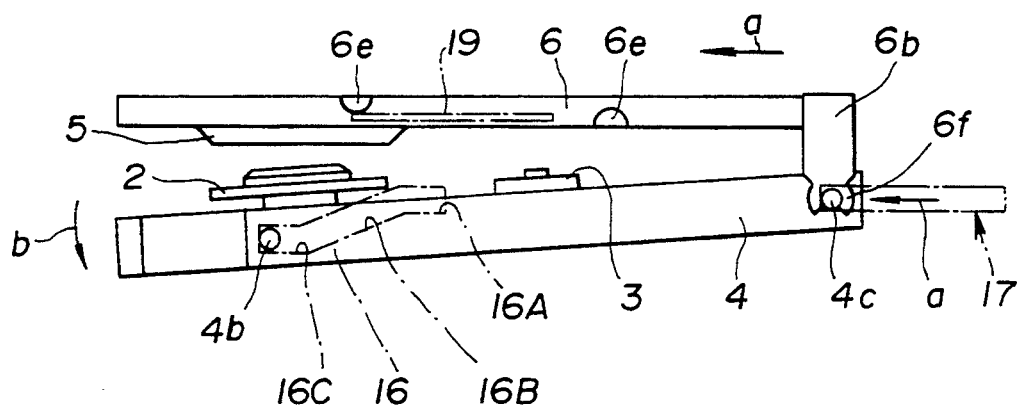

Referring to FIG. 8B, the guided parts 4c at the rear end of the movement block 4 are moved horizontally within the left and right rear guide grooves 17 in the direction of the arrow a, whereas the left and right forward guided parts 4b are slid to a low position 16C down a gradient 16B from an elevated position 16A within the substantially crank-shaped forward guide grooves 16 having the same height as the rear guide grooves 17, so that the movement block 4 is tilted by being rotated in the direction shown by an arrow b about the left and right guided parts 4c at the rear side as the center of rotation. Thus the movement block 4 is brought to a position of standstill by the left and right guided parts 4c being abutted against the forward end of the rear guide grooves 17. Meanwhile, the clamper slider 6 is slid horizontally in the direction of the arrow a by being guided by left and right guide rails 19.

Figure 9A:
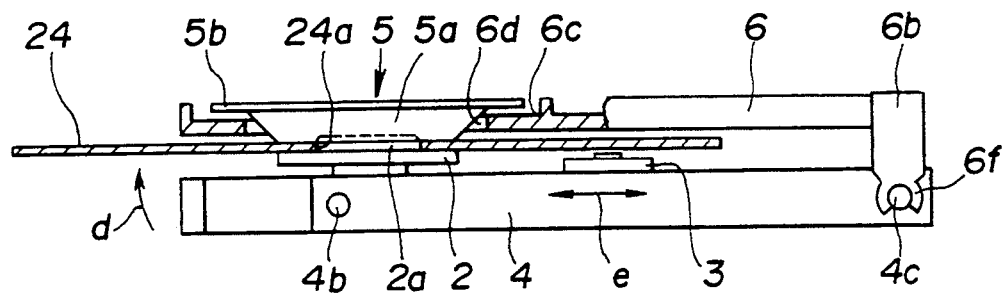
FIGS. 9A and 9B are schematic side elevational views for explaining the magnetic disc chucking operation by the disc clamper and the disc table.
Figure 9B:
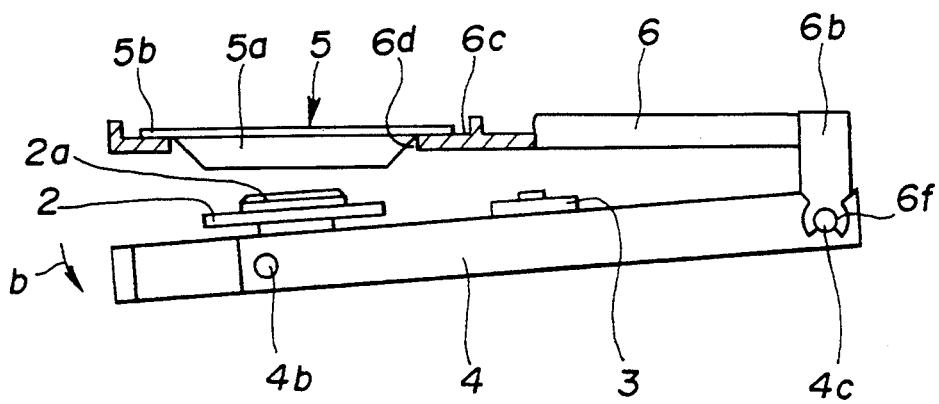

Thus, as shown in FIG. 9B, the disc clamper 5 is moved horizontally by the clamper slide 6 in the direction of the arrow a, whereas the disc table 2 is receded downwardly by being spaced apart from the disc clamper 5 in an obliquely inclined position as shown by an arrow b.

During loading, after a disc 24, which is a CD-ROM, is horizontally loaded in the disc-fitting hole 8c of the disc tray 8 as shown in FIG. 2, the disc tray 8 is guided by left and right guide rails 8d and tray guide grooves 18 so as to be manually thrust into the inside of the main body of the apparatus 23 in the direction of an arrow c (FIGS. 7A to 7C).

As soon as the disc tray 8 is thrust to a certain depth as shown by arrow c in FIG. 7B, the left and right projections 8e of the disc tray 8 are thrust against the left and right legs 6b of the clamper slider 6 from the direction shown by arrow c, so that the legs 6b are thrust by the disc tray 8 in the direction shown by arrow c. The left and right guided parts 4c of the rear ends of the movement block 4 are thrust by the left and right legs 6b of the clamper slider 6 in the direction shown by arrow c.

Thus the clamper slider 6 and the movement block 4 are thrust together by the disc tray 8 so that the clamper slider 6 and the movement block 4 are thrust in the direction of arrow c against the tension coil springs 20.

At this time, the clamper slider 6 is guided by the left and right guide rails 19 and slid horizontally in the direction of arrow c, as shown in FIG. 8A. The left and right guided parts 4c at the rear end of the movement block 4 are moved horizontally within the horizontal left and right rear guide grooves 17 in the direction of arrow c, whereas the left and right guided parts 4b at the forward end are slid up the gradient 16B from the low position 16C within the substantially crank-shaped forward guide grooves 16 as far as the elevated position 16A. Thus the movement block 4 is rotated upwardly in the direction of arrow d, with the left and right guided parts 4c at the rear side as the center of rotation, to assume a horizontal position.

Thus, as shown in FIG. 9A, the disc clamper 5 is moved horizontally, in the direction of an arrow c, by the clamper slider 6, so that the disc table 2 approaches the disc clamper 5 from an obliquely downward position, as indicated by an arrow d. As soon as disc table 2 assumes the horizontal position, a centering boss 2a provided at a mid position on the upper surface of the disc table 2 is fitted in centering hole 24a of the disc 24 from below so that the disc table 2 uplifts the disc 24 horizontally to a predetermined height out of the disc fitting recess 8c of the disc tray 8, as shown in FIG. 7B. As soon as disc clamper 5 is uplifted above the recess 6c of the clamper slider 6, as shown in FIG. 9A, along with disc 24, the disc clamper 5 is attracted by a magnet, not shown, embedded in an outer rim region of the upper surface of the disc table 2, so that the disc 24 is magnetically chucked on the disc table 2 by disc clamper 5. At this time, the optical pickup 3 approaches the lower surface of the disc 24.

When the disc tray 8 is fully thrust into the inside of the main body of the apparatus 23, as shown in FIG. 7B, the tray decorative plate 8b is abutted by a buffer rubber 25, attached to the forward end of main block member 4a of the movement block 4 shown in FIG. 6, at the same time that the disc tray 8 is locked by an electromagnetic locking device mounted on the tray-locking block 13.

The above completes the loading operation. The disc table 2, disc 24 and the disc clamper 5 are rotationally driven in unison so that the optical pickup 3 is moved in opening 4d of movement block 4 as shown by an arrow e in FIG. 9A to effect reproduction of the disc 4.

For ejection, an ejection button 26, mounted on the front panel 9, is thrust. This releases the locking of the electromagnetic locking apparatus provided on the tray-locking block 13. The movement block 4 and the clamper slider 6 are thrust by the left and right tension coil springs 20 in the direction of an arrow a, as shown in FIG. 7C, by the reverse of the above described sequence of operations for the loading operation, while the disc tray 8 is ejected horizontally in the direction of an arrow a by the left and right legs 6b of the clamper slider 6.

Then, as shown in FIG. 9B, by the disc table 2 is moved away from disc clamper 5 in the direction of arrow b, and the disc 24 is lowered by its own gravity to below the disc clamper 5 so as to be placed again horizontally in the disc-fitting recess 8c of the disc tray 8. Meanwhile, since the movement block 4 and the clamper slider 6 are halted when ejected in the direction of arrow a to a position shown in FIG. 8B by the left and right tension coil springs 20, the disc tray 8 may be extracted manually in the direction of arrow a, as shown in FIG. 7C.

It is to be noted that the loading mechanism of the present invention is not limited to the CD-ROM driving apparatus shown in the above-described embodiments, but may be applied to a variety of disc driving apparatus adapted for recording and/or reproducing various discs for recording/reproduction.

What is claimed is:

1. A disc loading mechanism for a disc driving apparatus comprising
a disc transport member having a tray for setting a disc thereon and substantially translationally movable between an open position in which the disc may be attached to or detached from said tray and a closed position in which the disc is positioned on a turntable for rotationally driving said disc,
a turntable supporting member having said turntable and operatively linked to movement of said disc transport member towards said closed position for being moved substantially parallel to said disc transport member to a loading position in which said disc is positioned on said turntable,
a pair of side plates, and
a pair of guide plates mounted on said side plates and having a first guide surface for guiding the movement of said disc transport member and second guide surfaces for engaging with and guiding a guided member provided on said turntable supporting member and for moving said turntable towards said tray into engagement with said turntable when said turntable supporting member is moved to said loading position in unison with said disc transport member.

2. The disc loading mechanism as defined in claim 1 further comprising a clamper movable substantially parallel to said disc transport member, said clamper reaching a position facing said tray when said disc transport member reaches said closed position for being engaged with said turntable guided by said guide for positioning said disc therein.

3. The disc loading mechanism as defined in claim 2 further comprising a transducer head on said turntable supporting member.

4. The disc loading mechanism as defined in claim 2 wherein said side plates have upper end parts thereof connected to each other by an upper plate, and wherein a third guide surface is provided on an inner surface of said upper plate for guiding movement of said clamper.

5. The disc loading mechanism as defined in claim 2 wherein said clamper has a clamper disc and a clamper slider for supporting said clamper disc, said clamper disc being loosely supported between the guide surface of said upper plate and said clamper slider.

6. The disc loading mechanism as defined in claim 1 wherein each one of the guide plates comprises an upper guide plate and a lower guide plate with a groove inbetween the upper guide plate and the lower guide plate, the groove defining a part of the first guide surface of each guide plate.

7. The disc loading mechanism as defined in claim 6, wherein the upper guide plates each have an upper surface which constitutes a different one of the second guide surfaces.

8. The disc loading mechanism as defined in claim 6, wherein the lower guide plates are integrally formed with a different one of each of the side plates and each of the upper guide plates has snap fit engaging means for engaging each of the upper guide plates with a different one of the side walls.

9. A method for assembling a disc driving apparatus comprising the steps of:
(a) positioning a chassis horizontally in an upside-down position;
(b) setting clamping means slidable on an upper plate of the chassis in an upside-down position;
(c) setting a disc tray on the chassis in an upside-down position so that left and right guide rails of the disc tray are set horizontally on left and right guide surfaces of the chassis, respectively;
(d) setting a movement block which has a pair of first guide parts and a pair of second guide parts on the chassis in an upside-down position so that the first guide parts are rotatably fitted to the clamping means and the second guide parts are fitted to the pair of guide surfaces which are formed on the chassis;
(e) setting a pair of guide components on the chassis in an upside-down position so that the second guide parts are fitted to a pair of guide surfaces formed on the chassis; and setting a lower plate on the chassis in an upside-down position.

10. The method for assembling the disc driving apparatus according to claim 9, wherein the step (b) comprises the steps of:

setting a disc clamper in an upside-down position on the upper plate of the chassis; and setting a clamper slider in an upside-down position on the disc clamper so that a clamper mounting hole formed on the clamper slider is loosely fitted from above on an outer rim of the disc clamper.

* * * * *